(12) United States Patent
Takemura

(10) Patent No.: US 6,842,606 B1
(45) Date of Patent: Jan. 11, 2005

(54) WIRELESS INFORMATION STORAGE DEVICE AND METHOD

(75) Inventor: Hisao Takemura, Kanagawa-Ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/517,186

(22) Filed: Mar. 2, 2000

(30) Foreign Application Priority Data

Mar. 3, 1999 (JP) .......................................... 11-055710

(51) Int. Cl.[7] .............................................. H04B 7/00
(52) U.S. Cl. ..................................... 455/41.1; 235/492
(58) Field of Search ........................... 455/73, 575, 90, 455/41.2, 41.1, 41.3, 90.1, 90.2, 90.3, 343.1, 344, 354, 128, 129, 351, 347; 235/492, 382, 384; 340/572.1, 572.2, 568.1, 825.3, 825.31, 825.33, 825.34, 825.54, 551, 568

(56) References Cited

U.S. PATENT DOCUMENTS 5,498,859 A * 3/1996 Farmont ..................... 235/384
6,010,074 A * 1/2000 Kelly et al. .................. 235/492
6,111,506 A * 8/2000 Yap et al. ................. 340/572.1
6,176,425 B1 * 1/2001 Harrison et al. ............. 235/385
6,373,447 B1 * 4/2002 Rostoker et al. ............. 343/895

* cited by examiner

Primary Examiner—Nick Corsaro
Assistant Examiner—Tanmay Lele
(74) Attorney, Agent, or Firm—Finnegan, Henderson, Farabow, Garrett & Dunner, L.L.P.

(57) ABSTRACT

A wireless information storage device and method for putting the device on or into an item are disclosed. According to the disclosed device and method, even if a plurality of wireless information storage devices is perfectly stacked, it is possible to read information from or write information into those wireless information storage devices with certainty at a time, furthermore, it is possible to improve efficiency of communicating with the wireless information storage device or the item.

7 Claims, 8 Drawing Sheets

WIRELESS INFORMATION STORAGE DEVICE AND METHOD

BACKGROUND OF THE INVENTION

I. Field of the Invention

The present invention generally relates to a wireless information storage device and a method for putting a wireless information storage device on or into an article. More particularly, the present invention relates to a device and a method for achieving both certainty and efficiency of a plurality of wireless information storage devices being communicated by a reader/writer system at a time.

II. Background and Material Information

A wireless information storage device, such as a wireless card or a wireless tag, has recently attracted a great deal of attention as an internal information carrier of the next generation because of its capability to read and write information with an external reader/writer system while being not being connected to the external system.

The wireless information storage device comprises a loop-shaped coil antenna that transmits signals to and receives signals from a wireless transmitter/receiver via wireless communication. The wireless transmitter/receiver comprises a large scale integrated circuit (LSI) and a memory for storing information. The wireless transmitter/receiver generates information, such as read, write, or command data, by demodulating a signal received via a coil antenna. The wireless transmitter/receiver also generates a signal to be transmitted via the coil antenna by modulating information. Both the antenna and the wireless transmitter/receiver may be molded in a plastic case hereinafter referred to as "molded case."

A multi-reader/writer system is used to communicate with the wireless information storage device. The multi-reader/writer system communicates with a plurality of wireless storage devices using single antenna. However, to effectively communicate, the multi-reader/writer system requires that the wireless information storage devices are not perfectly stacked, and thus not aligned so that the system could process information unerringly.

That is, if every molded case to be communicated with at a time has a same shape, and also has a same shaped built-in coil antenna in the same position, a 'coupling coil' that is composed of all the aligned coil antennas is created. The coupling coil causes a shift of the resonance point of each wireless information storage device. Furthermore, as the number of wireless information storage devices perfectly stacked increases, an electromotive force generated in the coil antenna of each of the wireless information storage devices is weakened because a magnetic flux going through the coil antenna is weakened.

Thus, when a plurality of wireless information storage devices is perfectly stacked, the multi-reader/writer system can not process information unerringly. Therefore, the efficiency for processing information for each wireless information storage device is low.

Furthermore, in case that each of a plurality of wireless information storage devices is located at the same position of an item, such as a compact disc (CD), to be communicated at a time, the efficiency for processing information for each item is low by the same reason.

SUMMARY OF THE INVENTION

In view of the foregoing, the present invention solves the inherent limitations of existing wireless information storage device and a method for putting a wireless information storage device on or into an item that substantially obviates one or more of the problems due to limitations and disadvantages of the past approaches.

In accordance with an aspect of the present invention, as embodied and broadly described, the present invention is directed to a wireless information storage device. The device comprises a coil antenna, a memory, a control unit, and a molded case. The coil antenna having a two-dimensional center for transmits and/or receives a signal via wireless communication. The memory stores information. The control unit that generates information by demodulating a signal received via the coil antenna, and generates a signal to be transmitted via the coil antenna by modulating information stored in the memory. The mold case includes the coil antenna. The two-dimensional center of the coil antenna is off from the two-dimensional center of the molded case.

Also in accordance with an aspect of the present invention, there is provided a wireless information storage device. The device comprises a coil antenna a memory, a control, and a molded case. The coil antenna has a two-dimensional center for transmitting and/or receiving a signal via wireless communication. The memory stores information. The control unit generates information by demodulating a signal received via the coil antenna, and generates a signal to be transmitted via the coil antenna by modulating information stored in the memory. The mold case having a two-dimensional center includes the coil antenna. Each coil antenna is located at a position in the device relatively different from each other when a plurality of devices is perfectly stacked.

Further in accordance with an aspect of the present invention, there is provided an item. The item has a two-dimensional center, and contains a wireless information storage device. The wireless information storage device also has a two-dimensional center. The item comprises a coil antenna, a memory, a control unit, and a molded case. The coil antenna transmits and/or receives a signal via wireless communication. The memory stores information. The control unit generates information by demodulating a signal received via the coil antenna, and generates a signal to be transmitted via the coil antenna by modulating information stored in the memory. The molded case includes the coil antenna. The two-dimensional center of the wireless information storage device is off from the two-dimensional center of the item.

In accordance with another aspect of the present invention, there is provided a method for putting a wireless information storage device containing a coil antenna and a board-shaped molded case on or into a board-shaped item having a two-dimensional center. The method comprises the step of putting the wireless information storage device on or into the two-dimensional center of the item.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and/or features of the invention and together with the description, serve to explain the principles of the invention. In the drawings.

DETAILED DESCRIPTION

The various aspects and features of the present invention will be hereinafter described with reference to the accompanying drawings.

Figure 1A:
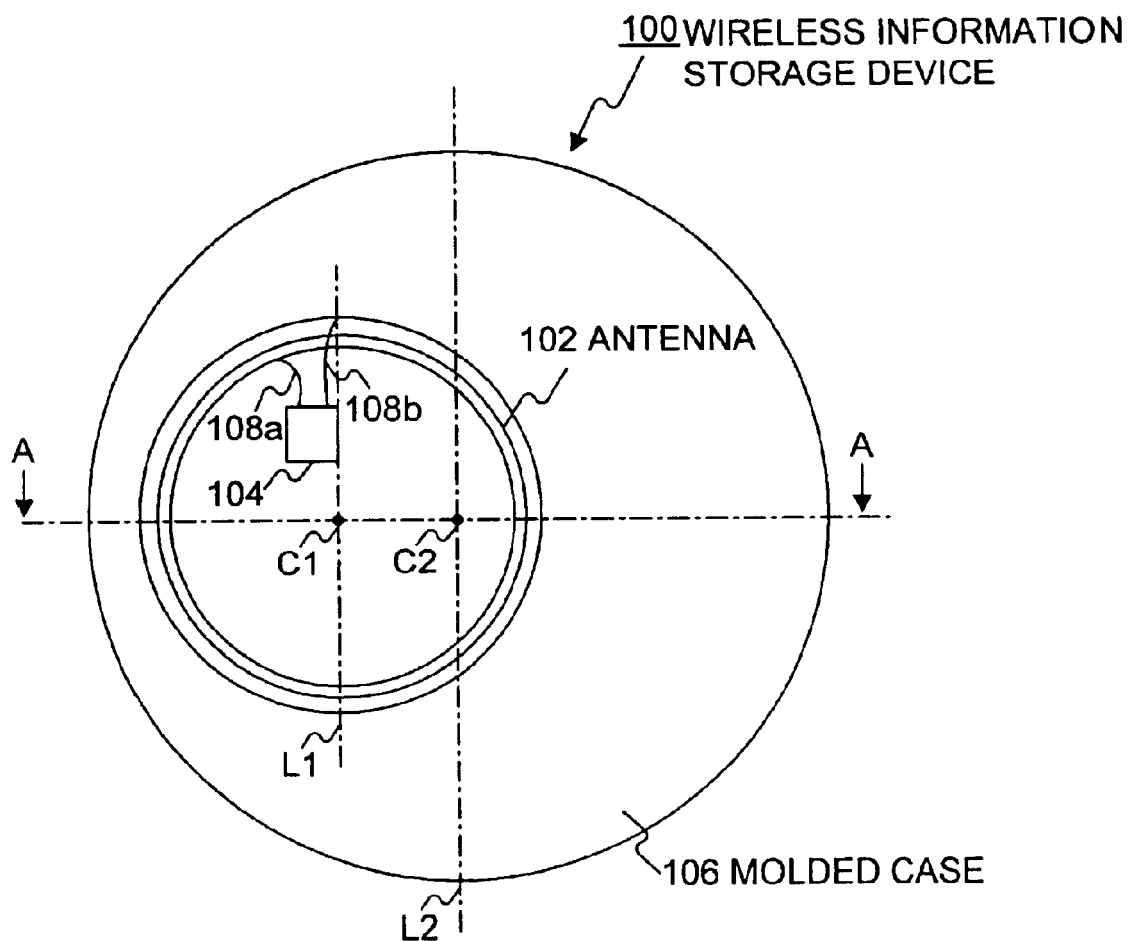
FIG. 1(a) is an exemplary horizontal cross section of a wireless information storage device 100 according to a first embodiment of the present invention.
Figure 1B:
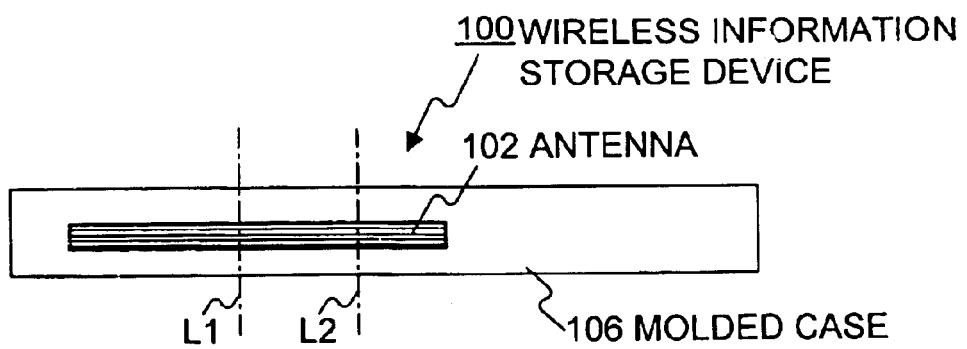
FIG. 1(b) is an exemplary vertical cross section of wireless information storage device 100 sectioned at a line A—A shown in FIG. 1(a)

FIG. 1(a) is an exemplary horizontal cross section of a wireless information storage device 100 according to a first embodiment of the present invention. FIG. 1(b) is an exemplary vertical cross section of wireless information storage device 100 sectioned at a line A—A shown in FIG. 1(a).

Wireless information storage device 100 such as a wireless tag is included in or attached to an item (not shown). An external reader/writer system (further described below) reads information regarding the item from wireless information storage device 100 and writes information to wireless information storage device 100 as needed using a wireless communication.

Wireless information storage device 100 comprises an antenna 102, a wireless transmitter/receiver 104, and a molded case 106.

Antenna 102, which has a loop-shaped coil, transmits signals to wireless transmitter/receiver 104 and also receives signals from wireless transmitter/receiver 104. Wireless transmitter/receiver 104, which comprises a large scale integrated circuit (LSI), generates information by demodulating a received signal. Wireless transmitter/receiver 104 also generates a signal to be transmitted by modulating information stored in a memory (further described below). Molded case 106 includes antenna 102 and wireless transmitter/receiver 104.

Antenna 102 and wireless transmitter/receiver 104 are connected to each other via conductors 108a and 108b. The wireless transmitter/receiver 104 is arranged in a space defined in the antenna 102. Molded case 106 may be a round-and-board-shaped disk. Molded case 106 may be 20 mm in diameter and 3–5 mm thick.

As shown in FIG. 1(a), loop-shaped coil antenna 102 is located with its center C1 off centered from the center C2 (i.e., gravitational center) of round-shaped molded case 106. In other words, as shown in FIG. 1(b), loop-shaped coil antenna 102 is located with its central axis L1 being approximately parallel to an axis perpendicular to the plane surface of molded case 106 and also off centered from central axis L2 of molded case 106.

As described above, wireless information storage device 100 is produced with antenna 102, which is included in or attached to wireless information storage device 100, purposely off centered from the center of the molded case 106.

Figure 2:
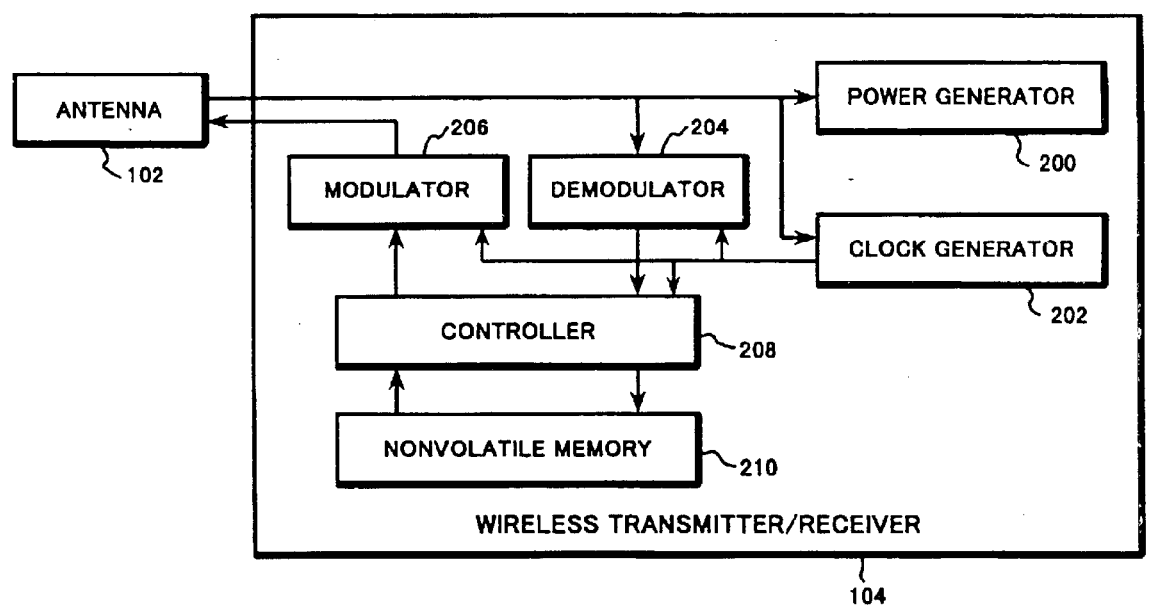
FIG. 2 is an exemplary block diagram depicting the configuration of wireless transmitter/receiver 104.

FIG. 2 is an exemplary block diagram depicting the configuration of wireless transmitter/receiver 104.

Wireless transmitter/receiver 104 comprises a power generator 200, a clock generator 202, a demodulator 204, a modulator 206, a controller 208, and a nonvolatile memory 210.

Power generator 200 generates electric power to be provided to each internal part of the device 100 by both rectifying and ballasting a signal received via antenna 102. Clock generator 202 generates a clock pulse from a received signal and supplies the clock pulse to each internal part. Demodulator 204 generates information to be stored in nonvolatile memory 210 by demodulating a received signal. Modulator 206 generates a signal to be transmitted by modulating information stored in nonvolatile memory 210. Controller 208 controls reading and writing information with nonvolatile memory 210.

Nonvolatile memory 210 stores information used for controlling wireless transmitter/receiver 104, information regarding wireless information storage device 100, such as an ID, and information regarding the location of an item.

Figure 3A:
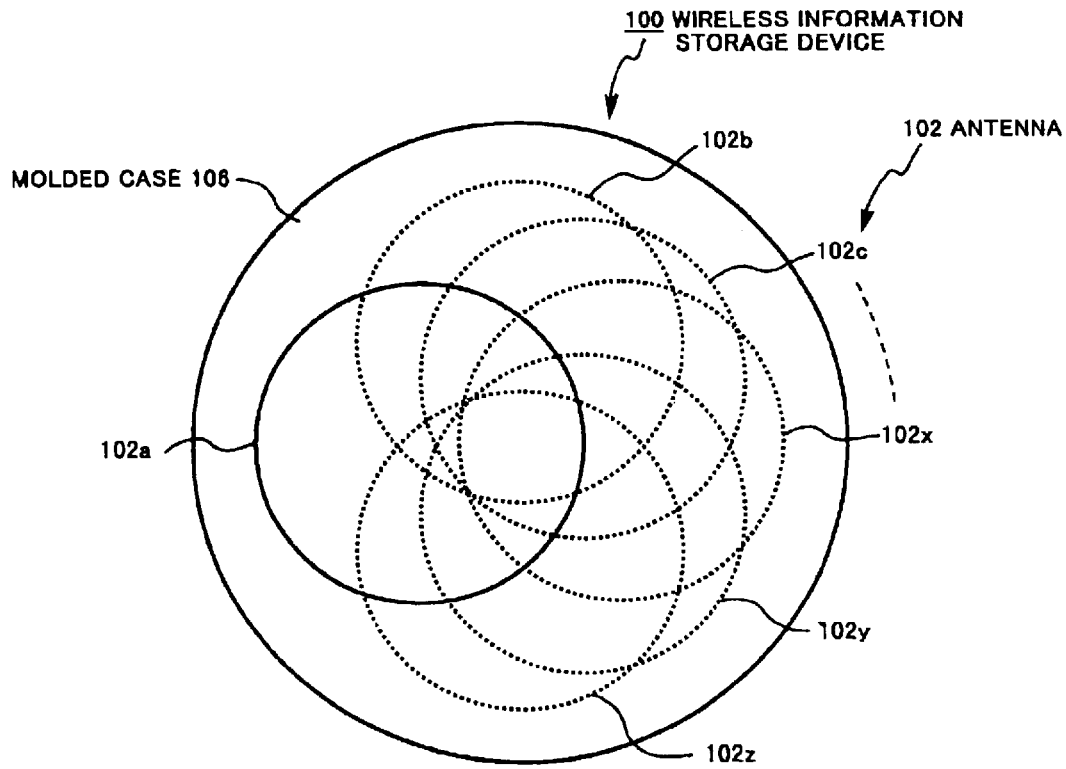
FIG. 3(a) is an exemplary diagram depicting locations of a plurality of antennas 102 of stacked wireless information storage devices 100, viewed from the direction perpendicular to the plane surface of molded case 106.
Figure 3B:
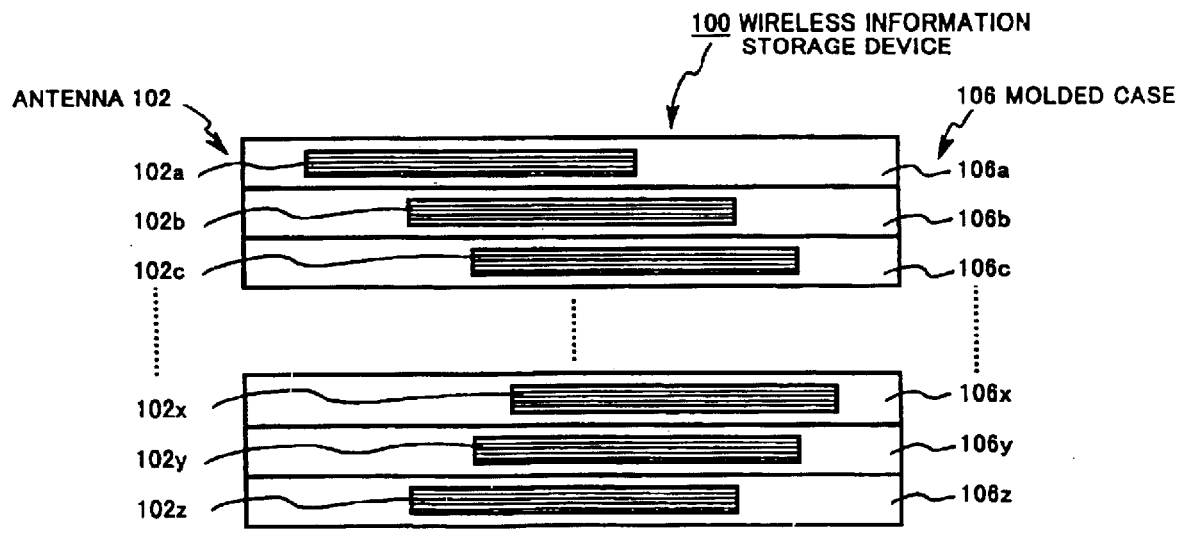
FIG. 3(b) is an exemplary diagram depicting locations of a plurality of antennas 102 of stacked wireless information storage devices 100, viewed from the direction parallel to the plane surface of molded case 106.

FIG. 3(a) is an exemplary diagram depicting locations of a plurality of antennas 102 of stacked up wireless information storage devices 100, viewed from the direction perpendicular to the plane surface of molded case 106. FIG. 3(b) is an exemplary diagram depicting locations of a plurality of antennas 102 of stacked wireless information storage devices 100, viewed from the direction parallel to the plane surface of molded case 106.

When a plurality of wireless information storage devices 100 is perfectly stacked as shown in FIG. 3(b), there is little possibility of these antennas 102, e.g., 102a, 102b, 102c, ..., and 102z, being located at the same position because each antenna 102 is not located at the center of molded cases 106, e.g., 106a, 106b, 106c, . . . , and 106z, as shown in FIG. 3(a). In other words, there is little possibility of the center axis of one of antennas 102 being located at the same position as the center axis of another antenna 102 is located.

Figure 4:
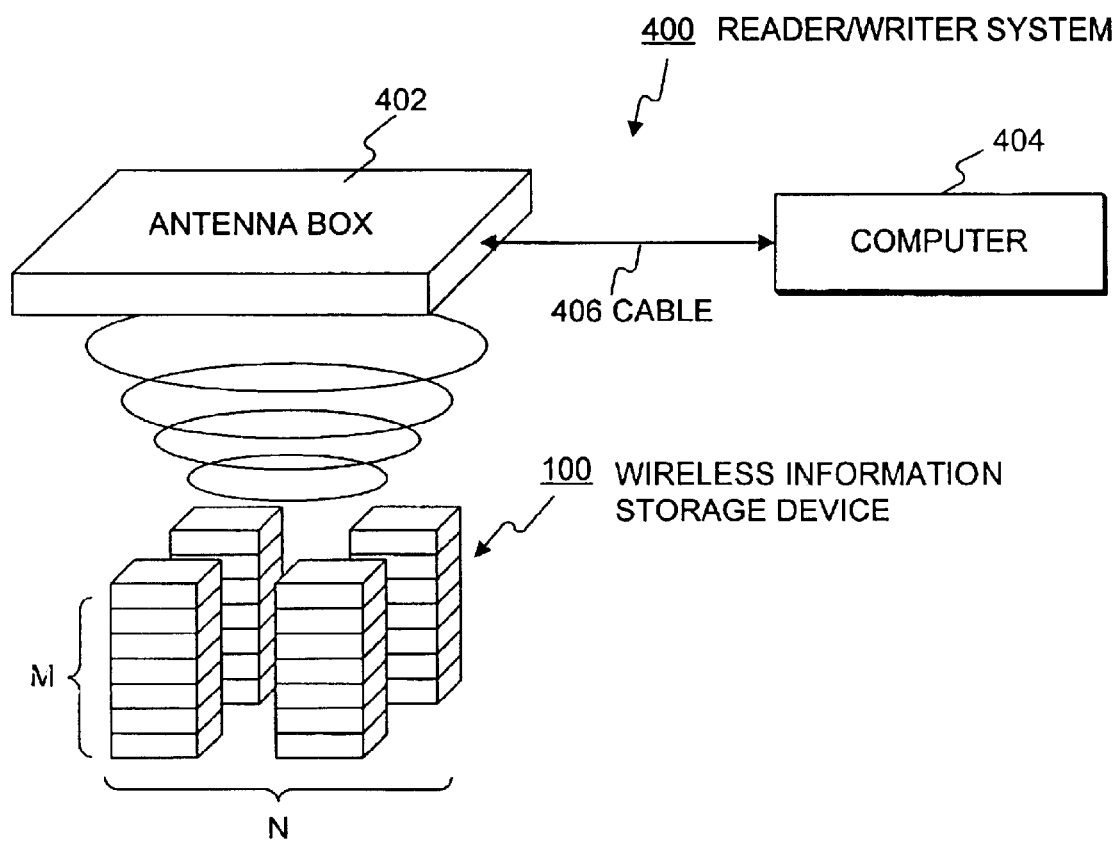
FIG. 4 is an exemplary block diagram depicting the configuration of reader/writer system 400.

FIG. 4 is an exemplary block diagram depicting the configuration of reader/writer system 400.

Reader/writer system 400 reads information from the above-described wireless information storage device 100 and also writes information into the above-described wireless information storage device 100 as needed, using wireless communication.

Reader/writer system 400 communicates with perfectly "M" stacked wireless information storage devices 100 in a line and "N" bunches of the devices 100 in a line.

When wireless information storage device 100 enters into an area where read/writer system 400 can communicate, computer 404 instructs antenna box 402 to output a radio wave signal.

In each wireless information storage device 100, antenna 102 receives the radio wave signal, transforms the radio wave signal into an electric signal, and provides the electric signal to both power generator 200 and clock generator 202. Power generator 200 generates electric power necessary to drive each internal part using the electric signal and supplies the electric power to each internal part. Clock generator 202 generates a clock pulse from the electric signal and supplies the clock to each internal part.

Antenna 102 also provides the electric signal to demodulator 204. Demodulator 204 generates information by demodulating the electric signal. Controller 208 then stores the generated information into nonvolatile memory 210.

When controller 208 receives a signal used for a reading information from modulator 204, controller 208 determines the necessity of transmitting information. Controller 208 reads the information from nonvolatile memory 210 and outputs the information to modulator 206. Modulator 206 modulates the information into a signal and transmits the signal to reader/writer system 400 via antenna 102.

Reader/writer system 400 receives the transmitted signal via antenna box 402 and computer 404 processes the information read from nonvolatile memory 210.

As described above, even if a plurality of wireless information storage devices 100 is perfectly stacked in the direction perpendicular to the plane surface of those wireless information storage devices 100, there is little possibility of antennas 102 being located same position because each loop-shaped antenna 102 is not located in the center of each wireless information storage device 100.

Therefore, there is little possibility of some antennas 102 composing a coupling coil. As such, it is possible to read information from and write information into every wireless information storage device 100 instantaneously and with certainty. It is also possible to communicate with wireless information storage devices 100 and an item with wireless information storage device 100 efficiently and with certainty.

Next, wireless information storage device 100 comprising a molded case having other shape will be hereinafter described.

Figure 5A:
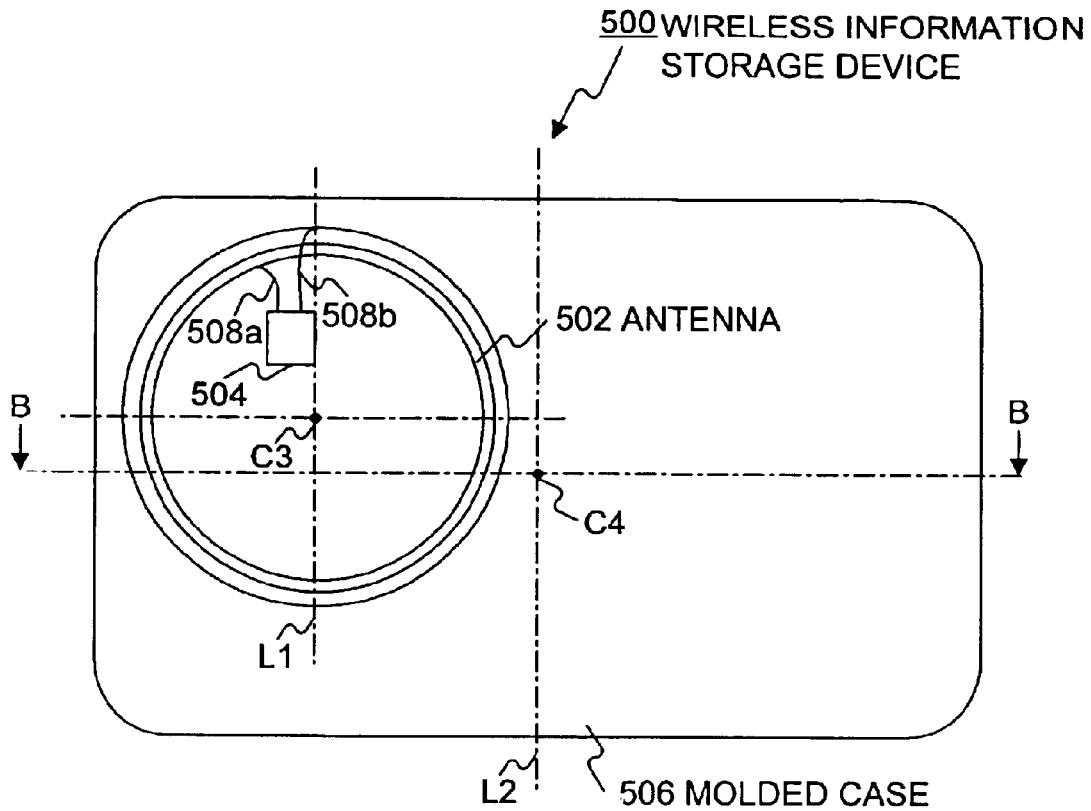
FIG. 5(a) is an exemplary horizontal cross section of a wireless information storage device 100 according to a second embodiment of the present invention.
Figure 5B:
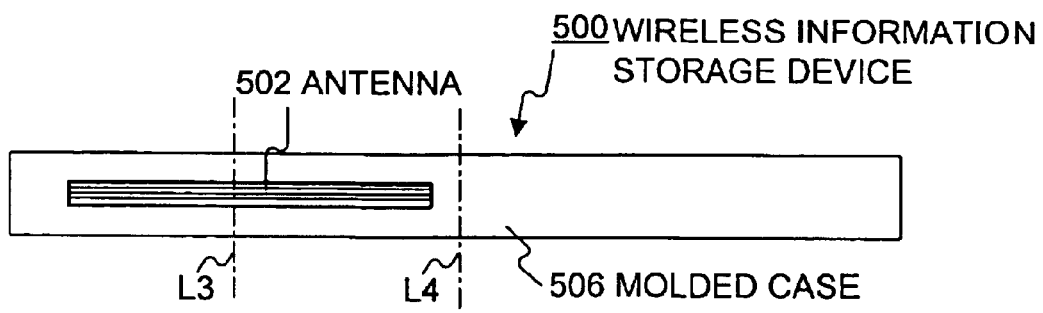
FIG. 5(b) is an exemplary vertical cross section of wireless information storage device 100 sectioned at a line B—B shown in FIG. 5(a)

FIG. 5(a) is an exemplary horizontal cross section of a wireless information storage device 500 according to a second embodiment of the present invention. FIG. 5(b) is an exemplary vertical cross section of wireless information storage device 500 sectioned at a line B—B shown in FIG. 5(a).

Wireless information storage device 500 comprises a loop-shaped antenna 502, a wireless transmitter/receiver 504, and a rectangle-shaped molded case 506. Antenna 502 and wireless transmitter/receiver 504 are connected to each other via conductors 508a and 508b. The wireless transmitter/receiver 104 is arranged in a space defined in the antenna 502.

As shown in FIG. 5(a), loop-shaped coil antenna 502 is located with its center C3 off centered from the center C4 (i.e., gravitational center) of round-shaped molded case 506. In other words, as shown in FIG. 5(b), loop-shaped coil antenna 502 is located with its central axis L3 being approximately parallel to an axis perpendicular to the plane surface of molded case 506 and also off centered from central axis L4 of molded case 506.

Figure 6A:
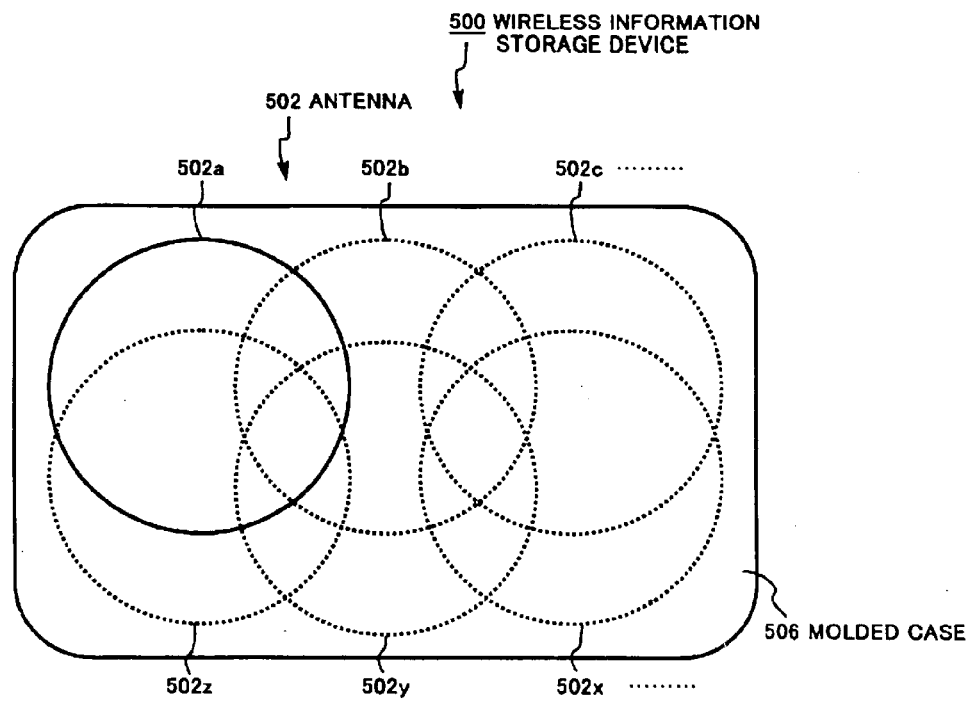
FIG. 6(a) is an exemplary diagram depicting locations of a plurality of antennas 502 of stacked wireless information storage devices 500, viewed from the direction perpendicular to the plane surface of molded case 506.
Figure 6B:
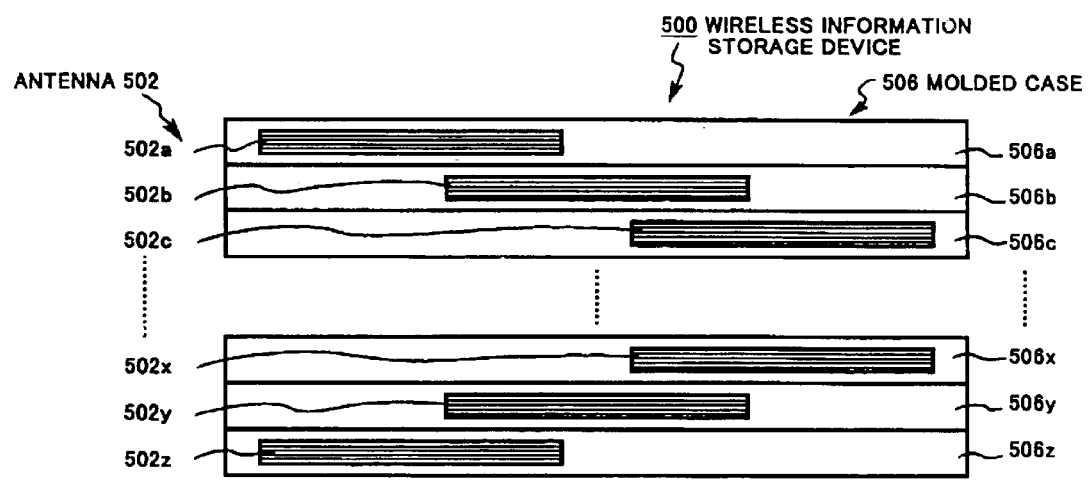
FIG. 6(b) is an exemplary diagram depicting locations of a plurality of antennas 502 of stacked wireless information storage devices 500, viewed from the direction parallel to the plane surface of molded case 506.

FIG. 6(a) is an exemplary diagram depicting locations of a plurality of antennas 502 of stacked wireless information storage devices 500, viewed from the direction perpendicular to the plane surface of molded case 506. FIG. 6(b) is an exemplary diagram depicting locations of a plurality of antennas 502 of piled up wireless information storage devices 500, viewed from the direction parallel to the plane surface of molded case 506.

When a plurality of wireless information storage devices 500 is perfectly stacked and aligned as shown in FIG. 6(b), there is little possibility of these antennas 502, e.g., 502a, 502b, 502c, . . . , and 502z, being located at the same position because each antenna 502 is not located at the center of molded case 506, e.g., 506a, 506b, 506c, . . . , and 506z, as shown in FIG. 6(a). In other words, there is little possibility of the center axis of one of antennas 502 being located at the same position as when the center axis of other antenna 502 is located.

Therefore, there is little possibility of some antennas 502 composing a coupling coil. It is possible to read information from and write information into every wireless information storage device 500 instantaneously and with certainty. As a result, it is possible to communicate with wireless information storage devices 500 and an item with wireless information storage device 500 efficiently and with certainty.

Next, a method for putting a wireless information storage device 700 on or into an item will be hereinafter described. The item is composed of a nonmetallic material or metallic material which does not influence wireless communication.

Figure 7:
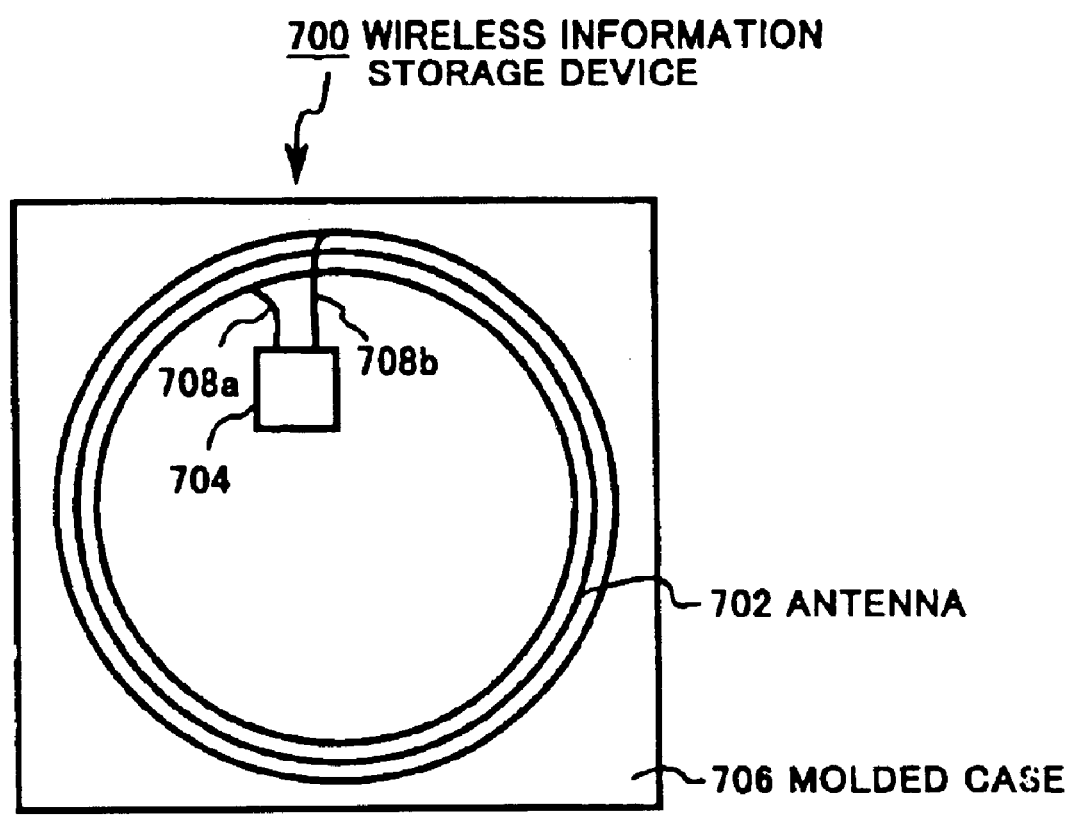
FIG. 7 is an exemplary horizontal cross section of a wireless information storage device 700 included in or attached with an article, according to a third embodiment of the present invention.

FIG. 7 is an exemplary horizontal cross section of wireless information storage device 700 included in or attached with an article, according to a third embodiment of the present invention.

Wireless information storage device 700 comprises a loop-shaped antenna 702, a wireless transmitter/receiver 704, and a rectangle-shaped mold case 706. Antenna 702 and wireless transmitter/receiver 704 are connected to each other via conductors 708a and 708b.

Figure 8A:
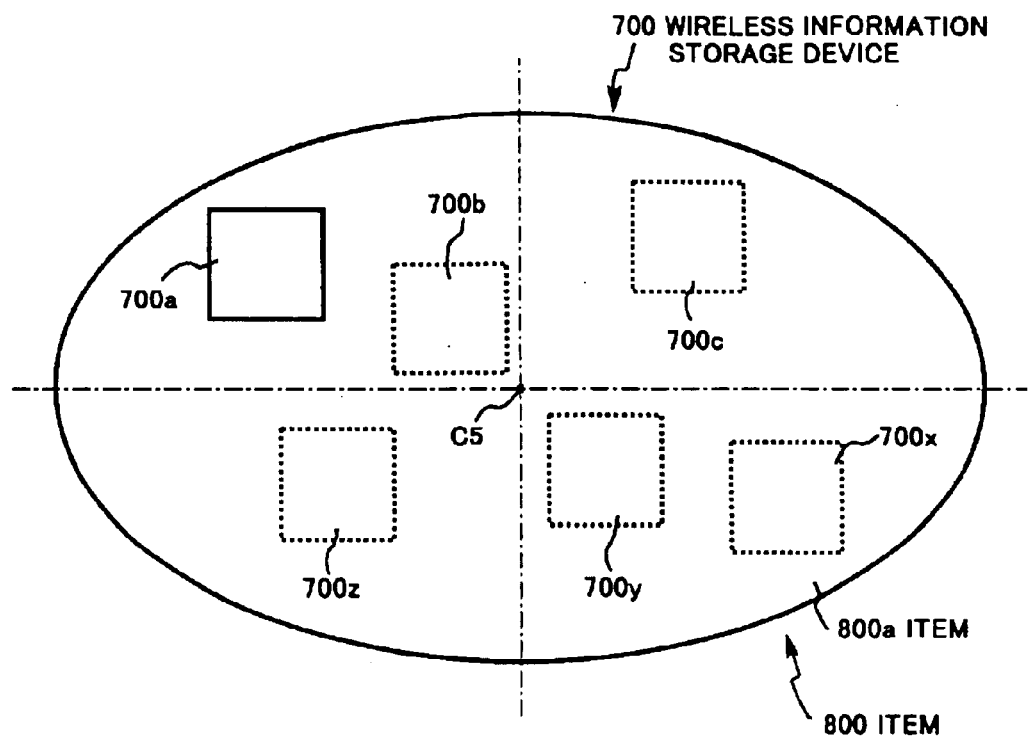
FIG. 8(a) is an exemplary diagram depicting locations of a plurality of wireless information storage device 700 of stacked item 800, viewed from the direction perpendicular to the plane surface of item 800.
Figure 8B:
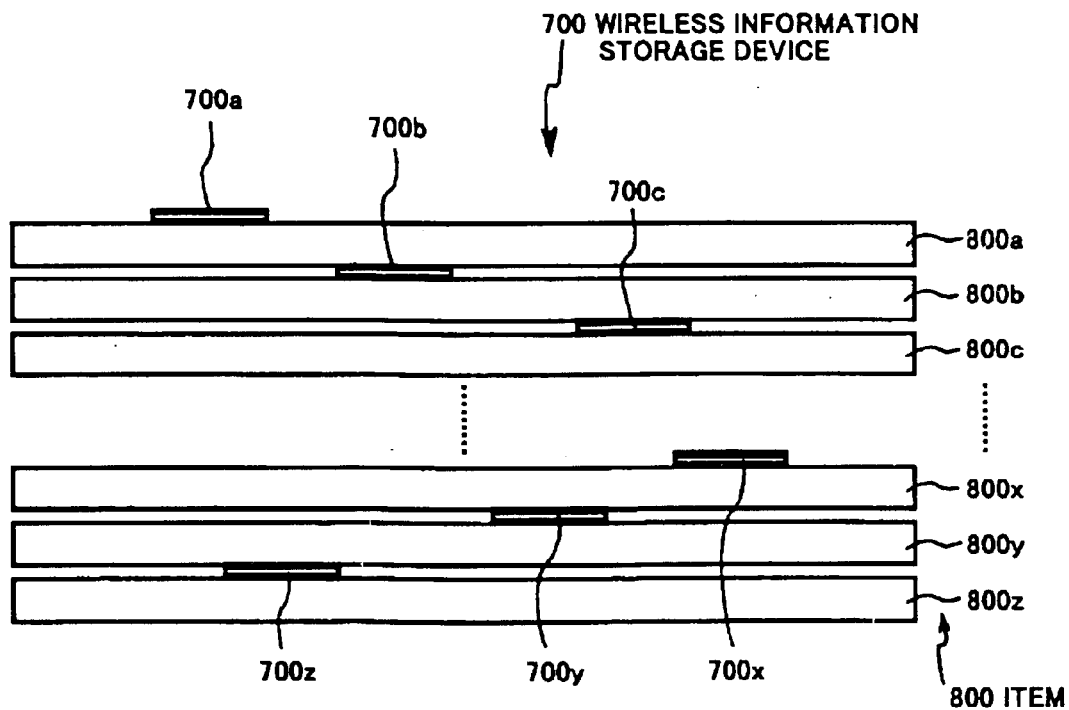
FIG. 8(b) is an exemplary diagram depicting locations of a plurality of wireless information storage device 700 of stacked item 800, viewed from the direction parallel to the plane surface of article 800.

FIG. 8(a) is an exemplary diagram depicting locations of a plurality of wireless information storage devices 700 of stacked items 800, viewed from the direction perpendicular to the plane surface of item 800. FIG. 8(b) is an exemplary diagram depicting locations of a plurality of wireless information storage devices 700 of piled up items 800, viewed from the direction parallel to the plane surface of item 800.

As shown in FIG. 8(a), wireless information storage device 700, e.g., 700a, 700b, 700c, . . . , and 700z, is located off from a two-dimensional center of gravity C5. When a plurality of items 800, e.g., 800a, 800b, 800c, . . . , and 800z, is perfectly stacked as shown in FIG. 8(b), there is little possibility of these wireless information storage devices 700 being located at the same position because each wireless information storage device 700 is not located at the center of item 800 as shown in FIG. 8(*a*). In other words, there is little possibility of the center axis of one of the antennas 702 being located at the: same position as the center axis of another antenna 702.

Therefore, there is little possibility of some antennas 702 composing a coupling coil. It is possible to read information from and write information into every wireless information storage device 700 instantaneously and with certainty. As a result, it is possible to communicate with wireless information storage device 700 and an item with wireless information storage device 700 efficiently and with certainty.

As described above, consistent with the principles of the present invention, even if a plurality of wireless information storage devices or items included in or attached to wireless information storage devices are perfectly stacked, it is possible to read information from or write information into those wireless information storage devices with certainty at the time, furthermore, it is possible to improve communications with efficiency of the wireless information storage device or the item.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A wireless information storage device, comprising:
   a coil antenna having a two-dimensional center for transmitting and/or receiving a signal via wireless communication and a space therein;
   a memory arranged in the space of the coil antenna for storing information;
   a control unit that generates information by demodulating a signal received via the coil antenna, and generates a signal to be transmitted via the coil antenna by modulating information stored in the memory, the control unit being arranged in the space of the coil antenna; and
   a molded case having a two-dimensional center including the coil antenna, wherein each coil antenna is nonconcentric with respect to coil antennas in other devices when a plurality of devices is stacked.

2. The device of claim 1, wherein the position is a place where the two-dimensional center of the coil antenna is off from the two-dimensional center of the molded case.

3. A reader/writer system comprising:
   a plurality of wireless information storage devices having substantially planar surfaces, the same outer shapes and sizes, and which are stacked, wherein each of the devices includes:
   a coil antenna that transmits and/or receives a signal via wireless communication and has a two-dimensional center;
   a memory arranged in the space of the coil antenna to store information;
   a control unit that generates information by demodulating a signal received via the coil antenna, and generates a signal to be transmitted via the coil antenna by modulating information stored in the memory, the control unit being arranged in the space of the coil antenna; and
   a molded case including the coil antenna, wherein the two-dimensional center of the coil antenna is off from the two-dimensional center of the molded case;
   an antenna box that communicates with the plurality of wireless information storage devices to receive the signal from the plurality of the wireless information storage devices; and
   a computer connected to the antenna box to process the signal received via the antenna box,
   wherein each coil antenna is located at a position in the wireless information storage device relatively different from each other when the plurality of wireless information storage devices are stacked in a direction perpendicular to their planar surfaces.

4. The system of claim 3, wherein each molded case has a round-and-board shape.

5. The system of claim 3, wherein each molded case has a rectangular shape.

6. The system of claim 3, wherein each memory is a nonvolatile memory.

7. A reader/writer system comprising:
   a plurality of items with planar surfaces, wherein a wireless information storage device on or in each item is located off from a two-dimensional center of each item, each device comprising a loop-shaped coil antenna, a wireless transmitter/receiver, and a molded case containing the antenna and the wireless transmitter/receiver therein;
   an antenna box that communicates with each of the wireless information storage devices to receive a signal from the wireless information storage devices; and
   a computer connected with the antenna box to process the signal received via the antenna box,
   wherein each device is located at a position on or in an item relatively different from each other when the plurality of items are stacked in a direction perpendicular to their planar surfaces.

* * * * *

UNITED STATES PATENT AND TRADEMARK OFFICE
CERTIFICATE OF CORRECTION

PATENT NO. : 6,842,606 B1
DATED : January 11, 2005
INVENTOR(S) : Takemura

It is certified that error appears in the above-identified patent and that said Letters Patent is hereby corrected as shown below:

Column 7,
Lines 51-52, delete "having substantially planar" to -- having planar --.

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,842,606 B1  Page 1 of 1
APPLICATION NO. : 09/517186
DATED : January 11, 2005
INVENTOR(S) : Takemura It is certified that error appears in the above-identified patent and that said Letters Patent is hereby corrected as shown below:

Claim 3, column 7, lines 51-52, change "having substantially planar" to --having planar--.

Signed and Sealed this

Fifth Day of September, 2006

JON W. DUDAS
*Director of the United States Patent and Trademark Office*